United States Patent
Peirick et al.

(10) Patent No.: US 10,836,903 B2
(45) Date of Patent: Nov. 17, 2020

(54) TOUGH POLYAMIDE MOULDING MATERIAL

(71) Applicant: Evonik Operations GmbH, Essen (DE)

(72) Inventors: Heinrich Peirick, Coesfeld (DE); Jasmin Berger, Dortmund (DE); Franz-Erich Baumann, Duelmen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 15/675,128

(22) Filed: Aug. 11, 2017

(65) Prior Publication Data

US 2018/0044520 A1    Feb. 15, 2018

(30) Foreign Application Priority Data

Aug. 12, 2016 (EP) ..................... 16184006

(51) Int. Cl.
*C08L 77/06* (2006.01)

(52) U.S. Cl.
CPC ............ *C08L 77/06* (2013.01); *C08L 2201/10* (2013.01); *C08L 2205/035* (2013.01); *C08L 2207/53* (2013.01)

(58) Field of Classification Search
CPC .............................. C08L 2207/53; C08L 77/06
See application file for complete search history.

(56) References Cited

U.S. PATENT DOCUMENTS

| | | | |
|---|---|---|---|
| 3,393,210 A | 7/1968 | Speck | |
| 5,360,891 A | 11/1994 | Wenzel et al. | |
| 5,457,156 A * | 10/1995 | Liu | ........................ C08F 279/02 525/74 |
| 5,534,594 A | 7/1996 | Troy et al. | |
| 2003/0235666 A1 * | 12/2003 | Buhler | ................. C08G 69/265 428/35.7 |
| 2007/0249789 A1 | 10/2007 | Bühler et al. | |
| 2008/0306185 A1 * | 12/2008 | Uradnisheck | ............ C08J 3/226 523/201 |
| 2009/0044906 A1 * | 2/2009 | Goring | ................ B29C 65/1425 156/272.8 |
| 2009/0149600 A1 | 6/2009 | Ness | |
| 2011/0062170 A1 * | 3/2011 | Kemper | ............. A47G 19/2266 220/708 |
| 2012/0028060 A1 * | 2/2012 | Etzel | ....................... B32B 27/08 428/473.5 |
| 2013/0255756 A1 * | 10/2013 | Seo | ..................... C08L 23/0815 136/251 |
| 2013/0309503 A1 * | 11/2013 | Shin | ....................... C08G 77/26 428/413 |
| 2014/0275392 A1 | 9/2014 | Bühler et al. | |
| 2015/0099847 A1 | 4/2015 | Huelsmann et al. | |
| 2016/0295705 A1 * | 10/2016 | Stoeppelmann | ......... C08K 3/22 |
| 2018/0291202 A1 * | 10/2018 | Deyrail | .................... C08L 77/02 |
| 2019/0085164 A1 * | 3/2019 | Sabard | .................... C08L 77/06 |

FOREIGN PATENT DOCUMENTS

| | | |
|---|---|---|
| DE | 1 595 150 | 3/1970 |
| DE | 37 28 685 | * 3/1988 |
| EP | 0 619 336 | 10/1994 |
| EP | 0 722 961 | 7/1996 |
| EP | 1 847 569 | 10/2007 |
| EP | 2 778 190 | 9/2014 |

* cited by examiner

*Primary Examiner* — Jeffrey C Mullis
(74) *Attorney, Agent, or Firm* — Oblon, McClelland, Maier & Neustadt, L.L.P.

(57) ABSTRACT

A moulding material contains to an extent of at least 50 wt % of the combination of the following constituents a) 80 to 97 parts by mass of a polyamide component containing a1) 70 to 100 parts by wt of PA PACMX (wherein X=8 to 18), and a2) 30 to 0 parts by wt of a linear aliphatic polyamide having on average 8 to 12 carbon atoms in the monomer units, wherein the parts by wt sum to 100, and b) 20 to 3 parts by mass of a core-shell modifier which contains the following: b1) a core which contains 60 to 100 wt % of butadiene units and 0 to 40 wt % of styrene units, wherein the core makes up 60 to 95 wt % of the core-shell modifier; and b2) a shell which contains 80 to 100 wt % of methyl methacrylate units and 0 to 20 wt % of modifying monomer units, wherein the shell makes up 5 to 40 wt % of the core-shell modifier, wherein the parts by mass of a) and b) sum to 100.

20 Claims, 1 Drawing Sheet

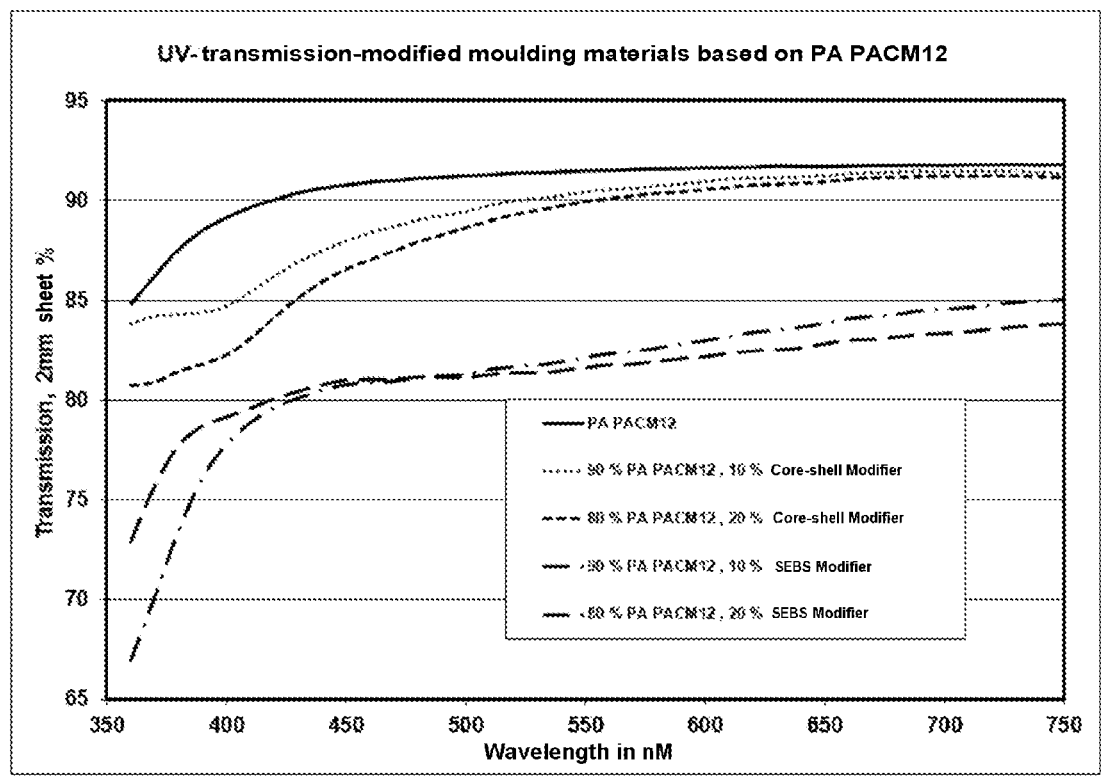

TOUGH POLYAMIDE MOULDING MATERIAL

BACKGROUND OF THE INVENTION

Field of the Invention

The present invention relates to a moulding material which comprises a transparent polyamide and a special core-shell modifier. Such moulding materials are transparent and exhibit improved mechanical properties compared to the base polymer.

Description of the Related Art

Transparent polyamides made of bis(4-aminocyclohexyl) methane (PACM) having a content of trans,trans-stereoisomer of 30 to 70% and also dodecanedioic acid are known from DE 15 95 150 A1. Corresponding transparent polyamides made of from 35 to 60 mol % of trans,trans-bis(4-aminocyclohexyl)methane and 65 to 40 mol % of other diamines and also linear aliphatic dicarboxylic acids are described in EP 0 619 336 A2.

Polyamides based on PACM have valuable performance characteristics, for example at a suitable composition they are transparent but microcrystalline and thus solvent- and stress-cracking-resistant; their mechanical properties, for instance impact strength, are of a high standard. However impact strength, notch sensitivity and puncture resistance are still in need of improvement. This is important for example in the field of eyeglasses frames or other frames in particular in "sports" and "defence" applications.

SUMMARY OF THE INVENTION

The present invention has for its object to improve the notched impact strength of corresponding mouldings without impairing resistance to solvents and stress cracking. In addition there shall be no significant lowering of the transparency of the moulding materials. The recited requirements are typically met by toughness modification of the base polymers. However, toughness modification of transparent polymers is problematic since these moulding materials become cloudy as a result of mixing with the toughness modifier.

In one embodiment, the present invention relates to A moulding material which comprises to an extent of at least 50 wt % of the combination of the following constituents:
  a) 80 to 97 parts by mass of a polyamide component comprising
    a1) 70 to 100 parts by wt of PA PACMX (wherein X=8 to 18), and
    a2) 30 to 0 parts by wt of a linear aliphatic polyamide having on average 8 to 12 carbon atoms in the monomer units,
    wherein the parts by wt sum to 100, and
  b) 20 to 3 parts by mass of a core-shell modifier which comprises the following:
    b1) a core which comprises 60 to 100 wt % of butadiene units and 0 to 40 wt % of styrene units, wherein the core makes up 60 to 95 wt % of the core-shell modifier; and
    b2) a shell which comprises 80 to 100 wt % of methyl methacrylate units and 0 to 20 wt % of modifying monomer units, wherein the shell makes up 5 to 40 wt % of the core-shell modifier,
  wherein the parts by mass of a) and b) sum to 100.

BRIEF DESCRIPTION OF THE DRAWING

The FIGURE shows the transmission of the mouldings prepared in the examples.

DETAILED DESCRIPTION OF THE INVENTION

US2015/0099847A1 describes transparent polyamide blends based on
  PA PACM12 and a PA12 which achieve good transmissions but have only moderate notched impact strength.
  US2014/275392A1 describes polyamide moulding materials based on PACM or bis(3-methyl-4-aminocyclohexyl) methane (MACM) and decanedicarboxylic acid, dodecanedicarboxylic acid or tetradecanedicarboxylic acid which additionally comprise a functionalized styrene-ethylene/butylene-styrene block copolymer as an impact modifier. Comparative example 14 describes production of a moulding material from PA MACM12 and a core-shell polymer having butadiene-styrene copolymer as the core and polymethyl methacrylate as the shell. This moulding material has an impaired light transmission of only 76.1% while with functionalized styrene-ethylene/butylene-styrene block copolymer as impact modifier a light transmission in the range from 85% to 92% is achieved.

It has now been found that, surprisingly, this effect demonstrated for PA MACM12 is not present for corresponding moulding materials comprising polyamides based on PACM and that with suitable core-shell modifiers light transmissions are achieved here which, depending on thickness and wavelength, are only about 2 to 5% below the values for the pure polyamide, wherein toughness and breaking elongation are at a high level.

The problem was accordingly solved by a moulding material which consists to an extent of at least 50 wt %, preferably at least 60 wt %, particularly preferably at least 70 wt%, especially preferably at least 80 wt % and very particularly preferably at least 90 wt %, of the combination of the following constituents:
  a) 80 to 97 parts by mass, preferably 82 to 95 parts by mass and particularly preferably 85 to 92 parts by mass of a polyamide component comprising
    a1) 70 to 100 parts by wt, preferably 75 to 99 parts by wt, particularly preferably 80 to 98 parts by wt and especially preferably 85 to 97 parts by wt of PA PACMX (where X=8 to 18) and
    a2) 30 to 0 parts by wt, preferably 25 to 1 parts by wt, particularly preferably 20 to 2 parts by wt and especially preferably 15 to 3 parts by wt of a linear aliphatic polyamide having on average 8 to 12 carbon atoms in the monomer units,
    wherein the parts by wt of a1) and a2) sum to 100, and
  b) 20 to 3 parts by mass, preferably 18 to 5 parts by mass and particularly preferably 15 to 8 parts by mass of a core-shell modifier which comprises the following:
    b1) a core which comprises 60 to 100 wt % and preferably 70 to 100 wt % of butadiene units and 0 to 40 wt % and preferably 0 to 30 wt % of styrene units, wherein the reported percentages are based on the core and wherein the core makes up 60 to 95 wt %, preferably 70 to 94 wt % and particularly preferably 75 to 93 wt % of the core-shell modifier, and b2) a shell which comprises 80 to 100 wt % and preferably 90 to 100 wt % of methyl methacrylate units and 0 to 20 wt % and preferably 0 to 10 wt % of modifying monomer units in each case based on the shell and wherein the shell makes up 40 to 5 wt %, preferably 30 to 6 wt % and particularly preferably 25 to 7 wt % of the core-shell modifier, wherein the parts by mass of a) and b) sum to 100.

In a preferred embodiment the polyamide component according to a) consists only of the polyamide a1) while a2) is not present.

In a further preferred embodiment the core b1) does not comprise any styrene units.

The nomenclature used here for the polyamides is in accordance with EN ISO 1874-1. Accordingly; PA PACMX describes a polyamide composed of monomer units which derive from bis(4-aminocyclohexyl)methane (PACM) and a linear dicarboxylic acid having X carbon atoms. According to the invention said linear dicarboxylic acid having X carbon atoms may be:

X=8: octanedioic acid (suberic acid)
X=9: nonanedioic acid (azelaic acid)
X=10: decanedioic acid (sebacic acid)
X=11: undecanedioic acid
X=12: dodecanedioic acid
X=13: tridecanedioic acid (brassylic acid)
X=14: tetradecanedioic acid
X=15: pentadecanedioic acid
X=16: hexadecanedioic acid
X=17: heptadecanedioic acid
X=18: octadecanedioic acid In one preferred embodiment X is an even number; in another preferred embodiment X is 10 to 14 and particularly preferably 12.

The PA PACMX is typically produced from PACM and the dicarboxylic acid by polycondensation in the melt according to known processes. However, derivatives thereof may also be employed, for example the diisocyanate which derives from PACM, or a dicarboxylic diester.

PACM exists as a mixture of cis,cis,cis,trans and trans, trans isomers. It is commercially available with various isomer ratios. In one preferred embodiment the trans,trans isomer content of the PACM or of the employed derivative thereof is 30 to 70% and particularly preferably from 35 to 65%.

In another preferred embodiment the PA PACMX is microcrystalline with an enthalpy of fusion, measured in accordance with ISO 11357 at the 2nd heating at a heating and cooling rate of 20° C./min, of 5 to 40 J/g and particularly preferably of 8 to 35 J/g.

It is further preferable when the PA PACMX is transparent with a transmission of at least 85% and particularly preferably of at least 90% and with a haze of less than 3% and particularly preferably of less than 2% where both properties are determined to ASTM D1003 on injection moulded test specimens of 2 mm in thickness.

It is particularly preferable when the PA PACMX is a PA PACM12 in which the trans,trans isomer content of the PACM or of the employed derivative thereof is 30 to 70% and especially preferably 35 to 65% and which is microcrystalline with an enthalpy of fusion, measured in accordance with ISO 11357 at the 2nd heating at a heating and cooling rate of 20° C./min, of 5 to 40 J/g and particularly preferably of 8 to 35 J/g.

The linear aliphatic polyamide according to a2) has on average from 8 to 12 carbon atoms in the individual monomer units. Said polyamide is producible from a combination of diamine and dicarboxylic acid, from an ω-aminocarboxylic acid and/or the corresponding lactam. The monomer units in question are therefore the units which derive from lactam, ω-aminocarboxylic acid, diamine or dicarboxylic acid. The following polyamides are suitable by way of example:

Average of 8 carbon atoms: PA88, PA79, PA97, PA610, PA106
Average of 8.5 carbon atoms: PA 89, PA98, PA611, PA116, PA512
Average of 9 carbon atoms: PA99, PA810, PA108, PA612, PA126
Average of 9.5 carbon atoms: PA910, PA109, PA811,PA118, PA613, PA136, PA514
Average of 10 carbon atoms: PA10, PA1010, PA812, PA128, PA614, PA146
Average of 10.5 carbon atoms: PA1011, PA813, PA138, PA516
Average of 11 carbon atoms: PA11,PA1012, PA1210, PA913, PA139, PA814, PA148, PA616
Average of 11.5 carbon atoms: PA1112, PA1211,PA1013, PA1310, PA914, PA149, PA815, PA617, PA518
Average of 12 carbon atoms: PA12,PA1212, PA1113, PA1014, PA1410,PA816, PA618

Suitable polyamides further include copolyamides which, on the basis of suitable comonomer selection, comply with the proviso that the monomer units comprise on average 8 to 12 carbon atoms, for example the copolyamide composed of laurolactam, decanediamine and dodecaneclioic acid (co-PA12/1012). It will be appreciated that the component according to a2) employed may also be mixtures of appropriate polyamides, sufficient mutual compatibility being advantageous.

In one preferred embodiment the linear aliphatic polyamide according to a2) is semicrystalline with an enthalpy of fusion, measured in accordance with ISO 11357 at the 2nd heating at a heating and cooling rate of 20° C./min, of at least 20 J/g, particularly preferably of at least 25 J/g and especially preferably of at least 30 J/g.

The linear aliphatic polyamide according to a2) preferably has a relative solution viscosity $\eta_{rel}$ of 1.3 to 2.4, particularly preferably of 1.4 to 2.2 and especially preferably of 1.5 to 2.1. Here, $\eta_{rel}$ is determined to ISO 307 in a 0.5 wt % solution in m-cresol at 23° C. If the intention is to achieve particularly good flowability of the melt, it is advantageous to use a linear aliphatic polyamide having a low relative solution viscosity $\eta_{rel}$, for example in the range from 1.3 to 1.9, preferably in the range from 1.3 to 1.8, and particularly preferably in the range from 1.3 to 1.7.

Preferably employed linear aliphatic polyamides according to a2) are PA612, PA1010, PA 012, PA11 oder PA12, particularly preferably PA11 or PA12.

The core-shell modifier consists of particles having a weight-average diameter of 20 to 500 nm, preferably of 30 to 400 nm, particularly preferably of 40 to 350 nm and especially preferably of 50 to 300 nm. The core may be uncrosslinked; it is preferably crosslinked. The shell may be uncrosslinked or crosslinked. Crosslinking may be achieved during production by addition of a compound having two or more vinyl groups, for example divinylbenzene, ethylene glycol dimethylacrylate, trimethacrylates, triacrylates, allyl acrylate, allyl methacrylate, diallyl phthalate or triallyl isocyanurate. The shell may also have incorporated into it by polymerization further monomers having a functional group capable of reacting with polyamide, for example acrylic acid, glycidyl methacrylate, maleic anhydride or itaconic anhydride. Further modifying monomers which may be incorporated into the shell by polymerization are for example styrene, acrylonitrile, acrylamide or hydroxyethyl methacrylate.

In addition to the core and the shell the core-shell modifier may also comprise one or more intermediate shells if this is advantageous for achieving certain properties.

The production of such core-shell modifiers is described in EP0722961A1 or US2009/0149600 for example. Suitable types are commercially available.

In order to impair the transparency of the moulding material to the smallest possible extent the core-shell modifier is preferably chosen such that the difference in the refractive indices between the polyamide component and the core-shell modifier at 20° C. is less than 0.008, particularly preferably less than 0.005 and especially preferably less than 0.003. These refractive indices are determined to DIN EN ISO 489:1999 by method A (Zeiss Abbe model A instrument, Schott KL 150 B lamp, white cold light source). However, for a particle size in the lower range, for instance below 200 nm and in particular below 160 nm, a high transparency is retained even at a relatively high difference in the refractive indices.

The moulding material according to the invention is preferably transparent having a transmission of at least 85% and particularly preferably of at least 88%, measured on injection moulded test specimens having a thickness of 2 mm according to ASTM D1003.

The moulding material according to the invention may comprise as constituents, in addition to the components according to a) and b), further customary added substances preferably chosen such that they impair transparency only to the smallest possible extent if at all, for example flame retardants, stabilizers, plasticizers, glass fibres, fillers, nanoparticles, antistats, dyes, pigments, mould-release agents or flow assistants. The amount of these further constituents is altogether not more than 50 wt %, preferably not more than 40 wt %, particularly preferably not more than 30 wt%, especially preferably not more than 20 wt% and very particularly preferably not more than 10 wt % or not more than 5 wt % based on the overall moulding material.

The moulding material may be produced by melt mixing on suitable kneaders or compounding machines, discharging and comminution. A multiphase system is concerned here where the modifier is present in the polyamide matrix in finely disperse form. The melt mixing is effected according to the prior art in a kneading assembly, discharge generally in the form of a strand/extrudate and comminution generally by pelletizing, crushing or grinding. The moulding material may be processed into a moulded article by melting and moulding by processes known to those skilled in the art such as injection moulding, extrusion, pressing or rolling.

The invention also provides the moulded articles produced from the mixture according to the claims. These are for example mouldings, films, bristles or fibres.

The moulded articles according to the invention feature in particular a combination of high transparency, high toughness and high resistance to chemicals, solvents and stress cracking. Possible applications are for example eyeglasses frames or other frames and also components where high mechanical resilience is required. Lifetime can be increased here by use of the mixture according to the invention The invention moreover makes it possible to produce films of higher perceived quality, for example for outer coatings of sports items such as skis or snowboards. This is apparent for example in a reduced speck count.

Having generally described this invention, a further understanding can be obtained by reference to certain specific examples which are provided herein for purposes of illustration only, and are not intended to be limiting unless otherwise specified.

The invention is elucidated by way of example hereinbelow.

The following materials were employed in the examples:
PA PACM12: microcrystalline polyamide produced from bis(4-aminocyclohexyl)methane having a content of trans, trans-stereoisomer of 48% and also dodecanedioic acid; $\eta_{rel}$=1.8; enthalpy of fusion 19 J/g Core-shell modifier: Paraloid EXL 2690 (Dow Chemical Company; shown by analysis to consist to an extent of about 80 wt % of a core in which only units of butadiene and no styrene units are detectable and to an extent of about 20 wt % of a shell constructed essentially from methyl methacrylate units)

SEBS modifier: Kraton FG1901

A melt mixture was produced from PA PACM12 and modifer on a kneader, discharged, pelletized and in pellet form processed into mouldings on an injection moulding machine (melt temperature 280° C.; mould temperature 80° C.). The results are shown in Table 1.

Compared to the PA PACM12 used the mouldings produced from the melt mixtures show a barely reduced transparency and a very good notched impact strength.

To determine transparency the moulding materials were processed into mouldings having dimensions of 60*60*2 mm (melt temperature 280° C.; mould temperature 80° C.) on an injection moulding machine and the transmission of the mouldings was measured (Xrite Ci7 instrument, light type D65, observer angle 10°). The results are shown in the FIGURE. While the inventive mouldings comprising the core-shell modifier show a high transparency the mouldings comprising the SEBS modifier show only a moderate transparency.

| Test | | | PA PACM12 Reference | Example 1 95% PA PACM12 5% core-shell modifier | Example 2 90% PA PACM12 10% core-shell modifier | Example 3 80% PA PACM12 20% core-shell modifier |
|---|---|---|---|---|---|---|
| Impact strength (ISO 179/leU) | 23° C. | kJ/m$^2$ | 10/10 no fracture | 10/10 no fracture | 10/10 no fracture | 10/10 no fracture |
|  | −30° C. | kJ/m$^2$ | 10/10 no fracture | 10/10 no fracture | 10/10 no fracture | 10/10 no fracture |
| Notched impact strength (ISO179/leA) | 23° C. | kJ/m$^2$ | 12 | 26 | 57 | 32 |
|  | −30° C. | kJ/m$^2$ | 11 | — | 25.6 | 25.5 |
| ISO 527 tensile test | | | | | | |
| Yield stress | | N/mm$^2$ | 60 | 54.7 | 48.5 | 39.7 |
| Yield elongation | | % | 8.3 | 8 | 7.7 | 8.2 |

-continued

| Test | | PA PACM12 Reference | Example 1 95% PA PACM12 5% core-shell modifier | Example 2 90% PA PACM12 10% core-shell modifier | Example 3 80% PA PACM12 20% core-shell modifier |
|---|---|---|---|---|---|
| Breaking strength | N/mm² | 63 | 57.7 | 54 | 48 |
| Elongation at break | % | 200 | 164 | 154 | 147 |
| ISO 527 tensile modulus of elasticity | N/mm² | 1450 | 1350 | 1.230 | 1030 |
| L, a, b colour measurements, 2 mm sheet | CIELAB | 96.4/−0.06/0.28 | 96.42/−0.09/1.03 | 96.14/−0.11/1.74 | 95.88/−0.17/2.36 |
| Transmission at 550-750 nm, 2 mm | % | 91.5-91.8 | 91.1-91.6 | 90.5-91.3 | 90.0-91.1 |

Refractive index (20° C.) TROGAMID CX7323: 1.516
Refractive index (20° C.) Paraloid EXL 2690: 1.514

European patent application EP16184006 filed Aug. 12, 2016, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A moulding material, which comprises at least 50 wt % of the combination of the following constituents:
   a) 80 to 97 parts by mass of a polyamide component comprising
   a1) 70 to 100 parts by wt of PA PACMX (wherein X=8 to 18), and
   a2) 30 to 0 parts by wt of a linear aliphatic polyamide having on average 8 to 12 carbon atoms in the monomer units,
   wherein the parts by wt sum to 100; and
   b) 20 to 3 parts by mass of a core-shell modifier comprising
   b1) a core which comprises 60 to 100 wt % of butadiene units and 0 to 40 wt % of styrene units, wherein the core makes up 60 to 95 wt % of the core-shell modifier, and
   b2) a shell which comprises 80 to 100 wt % of methyl methacrylate units and 0 to 20 wt % of modifying monomer units, wherein the shell makes up 5 to 40 wt % of the core-shell modifier,
   wherein the parts by mass of a) and b) sum to 100, and
   wherein the moulding material has a transmission at 550 to 750 nm of at least 85%, measured according to ASTM D1003 using injection moulded tests specimens having a thickness of 2 mm.

2. The moulding material according to claim 1, wherein the PA PACMX is at least one selected from the group consisting of PA PACM10, PA PACM12 and PA PACM14.

3. The moulding material according to claim 1, wherein the PA PACMX is a PA PACM12.

4. The moulding material according to claim 1, wherein the PA PACMX has been produced from a PACM having a content of trans,trans isomer of 30% to 70%.

5. The moulding material according to claim 1, wherein the PA PACMX is microcrystalline with an enthalpy of fusion, measured in accordance with ISO 11357 at the 2nd heating at a heating and cooling rate of 20° C./min, of 5 to 40 J/g.

6. The moulding material according to claim 1, wherein the PA PACMX is transparent with a transmission of at least 85% and a haze of less than 3% where both properties are measured according to ASTM D 1003 using injection moulded test specimens having a thickness of 2 mm.

7. The moulding material according to claim 1, wherein the PA PACMX is a PA PACM12, and wherein the PA PACM12
   a) has been produced from a PACM having a content of trans,trans isomer of 30% to 70%, and
   b) is microcrystalline with an enthalpy of fusion, measured in accordance with ISO 11357 at the 2nd heating at a heating and cooling rate of 20° C./min, of 5 to 40 J/g.

8. The moulding material according to claim 1, wherein the difference in the refractive indices between the polyamide component according to a) and the core-shell modifier according to b) at 20° C. is less than 0.008 measured according to DIN EN ISO 489:1999 by method A.

9. The moulding material according to claim 1, wherein said material consists of components a) and b) and not more than 50 wt % of further customary added substances.

10. A moulded article produced from the moulding according to claim 1.

11. The moulded article according to claim 10, wherein said article is a moulding, a film, a bristle or a fibre.

12. The moulded article according to claim 10, wherein said article is an eyeglasses frame, another frame or the surface coating of a sports article.

13. The moulding material according to claim 1, wherein the moulding material has a transmission at 550 to 750 nm of at least 88%, measured according to ASTM D1003 using injection moulded tests specimens having a thickness of 2 mm.

14. The moulding material according to claim 1, wherein the moulding material has a transmission at 550 to 750 nm of from 90.0 to 91.8%, measured according to ASTM D1003 using injection moulded tests specimens having a thickness of 2 mm.

15. The moulding material according to claim 1, which comprises at least 50 wt % of the combination of the following constituents:
   a) 80 to 95 parts by mass of a polyamide component comprising
   a1) 70 to 100 parts by wt of PA PACMX (wherein X=8 to 18), and
   a2) 30 to 0 parts by wt of a linear aliphatic polyamide having on average 8 to 12 carbon atoms in the monomer units,
   wherein the parts by wt sum to 100; and
   b) 20 to 5 parts by mass of a core-shell modifier comprising
   b1) a core which comprises 60 to 100 wt % of butadiene units and 0 to 40 wt % of styrene units, wherein the core makes up 60 to 95 wt % of the core-shell modifier, and
   b2) a shell which comprises 80 to 100 wt % of methyl methacrylate units and 0 to 20 wt % of modifying monomer units, wherein the shell makes up 5 to 40 wt % of the core-shell modifier.

16. The moulding material according to claim 14, wherein the PA PACMX is a PA PACM12.

17. The moulding material according to claim 16, wherein the PA PACM12.
   a) has been produced from a PACM having a content of trans,trans isomer of 30% to 70%, and
   b) is microcrystalline with an enthalpy of fusion, measured in accordance with ISO 11357 at the 2nd heating at a heating and cooling rate of 20° C./min, of 5 to 40 J/g.

18. The moulding material according to claim 14, wherein the difference in the refractive indices between the polyamide component according to a) and the core-shell modifier according to b) at 20° C. is less than 0.008 measured according to DIN EN ISO 489:1999 by method A.

19. The moulding material according to claim 1, wherein the only polyamide is the PA PACMX.

20. The moulding material according to claim 14, wherein the only polyamide is the PA PACMX.

* * * * *